United States Patent [19]

Hawley et al.

[11] 4,333,860

[45] Jun. 8, 1982

[54] SOLUBILIZED CHROMIUM SALT IN POLYMERIZATION CATALYST

[75] Inventors: Gil R. Hawley; Max P. McDaniel, both of Bartlesville, Okla.

[73] Assignee: Phillips Petroleum Company, Bartlesville, Okla.

[21] Appl. No.: 103,686

[22] Filed: Dec. 14, 1979

[51] Int. Cl.$^3$ .............................................. B01S 23/26
[52] U.S. Cl. ....................................... 252/458; 252/430
[58] Field of Search ........................ 252/430, 431, 458

[56] References Cited

U.S. PATENT DOCUMENTS

| | | | |
|---|---|---|---|
| 2,989,653 | 5/1961 | Witt | 252/458 |
| 3,900,457 | 8/1975 | Witt | 252/458 |
| 3,976,632 | 8/1976 | Delap | 526/96 |
| 4,053,437 | 10/1977 | Liu et al. | 252/458 |
| 4,212,765 | 7/1980 | Gutweiler | 252/431 |

*Primary Examiner*—G. O. Peters

[57] ABSTRACT

A chromium salt such as ammonium chromate or ammonium dichromate, which is normally insoluble in nonaqueous solvents which do not easily rehydrate the silica surface is solubilized, for instance by treating it with a crown ether, and impregnated onto a particulate support from a nonaqueous solvent which does not easily rehydrate the silica. The resulting composition is then activated in an oxygen ambient such as air in a conventional manner and then utilized as a catalyst for polymerization reactions such as the production of polyolefins.

11 Claims, No Drawings

SOLUBILIZED CHROMIUM SALT IN POLYMERIZATION CATALYST

BACKGROUND OF THE INVENTION

This invention relates to preparation of chromium-containing olefin polymerization catalysts.

Supported chromium oxide catalyst can be used to prepare olefin polymers in a hydrocarbon solution or diluent to give a product having excellent characteristics from many standpoints.

The chromium can be incorporated into the support in several different ways which are well known in the art. One such method involves coprecipitating a chromium compound with the support, for instance, by including a chromium compound in a silicate and thereafter combining same with an acid to form a gel. Frequently, the chromium compound is introduced by means of an aqueous impregnation of the support followed by removal of the water. Because water has an effect on the pore structure and/or surface of silica which is generally adverse, it is sometimes desirable to incorporate the chromium compound by means of a hydrocarbon solution of a soluble zero valent chromium compound such as dicumene chromium. Finally, the chromium compound can simply be physically mixed with the support, for instance by dry milling the support and the chromium compound.

Each of these means for incorporating chromium results in a catalyst having different characteristics even though after the activation the chromium may be oxidized to the same chromium oxide form. This is because the pore structure and/or surface of the support may be affected by the manner of chromium addition. Particularly, in the aqueous impregnation of chromium, the pore structure of the support may be damaged by the water, particularly by the removal of the water. In addition, water, primary alcohols and other materials which easily rehydrate the silica surface can have an adverse effect on the resulting catalyst and thus are not suitable solvents. However, this cannot be overcome simply by utilizing a hydrocarbon or other nonaqueous solution since ionic chromium compounds are generally insoluble in the type of nonaqueous solvents which do not easily rehydrate the silica surface. The use of an alcohol to dissolve a chromium compound such as $CrO_3$ is not always desirable either for the reason that the OH groups of the solvent may react with the silica or the solvent reacts with the chromium compound.

SUMMARY OF THE INVENTION

It is an object of this invention to achieve a catalyst having the characteristics associated with aqueously impregnated chromium without the necessity for introducing water or other solvents which tend to easily rehydrate the silica surface;

It is a further object of this invention to simplify the impregnation of chromium compounds into particulate supports by eliminating the need for careful removal of water;

It is yet a further object of this invention to utilize a normally ionic chromium compound in an impregnation using a nonaqueous solvent which does not easily rehydrate the silica surface;

It is a still yet further object of this invention to provide chromium catalysts having the chromium incorporated by nonaqueous means which catalyst is similar in characteristics to one produced by aqueous impregnation of the chromium.

In accordance with this invention, a chromium salt which is insoluble in nonaqueous solvents which do not easily rehydrate a silica surface, is treated with a solubilizing agent to convert it to a composition which is soluble in nonaqueous solvents which do not easily rehydrate the silica and the thus solubilized composition is thereafter impregnated onto a particulate support from a solution and activated to produce a catalyst.

DESCRIPTION OF THE PREFERRED EMBODIMENTS

The catalysts of this invention are formed from a support and a solubilized chromium salt formed by contacting a chromium salt, which is insoluble in nonaqueous solvents which do not easily rehydrate a silica surface, with a solubilizing agent. The resulting composition is then calcined in an oxygen ambient so as to convert at least a portion of the chromium to chromium oxide. The solubilized salts produced in accordance with this invention possess charged ions as compared with the neutral compounds such as $\pi$-bonded organochromium compounds which are conventionally added in an anhydrous solution.

The support is generally a particulate material selected from silica or a silica-containing material such as silica-alumina, silica-boria, silica-thoria, silica-titania, silica-zirconia, and other refractory materials and mixtures thereof. Particularly suitable are silica gels prepared by coprecipitating a silicate and a titanium compound to form a hydrogel (titanium cogel) and then drying to form a silica xerogel as disclosed in Dietz, U.S. Pat. No. 3,887,494 (June 3, 1975), the disclosure of which is hereby incorporated by reference.

The presently preferred solubilizing agents are macrocyclic polyether compounds (crown ethers). The macrocyclic polyether compounds are known and they can be prepared as described in U.S. Pat. No. 3,687,978 which issued Aug. 29, 1972 to Charles John Pedersen and in an article by Pedersen in the Journal of the American Chemical Society 89 (26), 7017–7037 (1960), the disclosures of which are hereby incorporated by reference. Suitable polyether compounds empoloyable in this invention preferably contain from about 4 to about 10 oxygen atoms in the ring, each oxygen atom preferably being separated from the next one by links of 2 carbon atoms. The macrocyclic ring can be joined to 1 to 4 carbocyclic rings selected from among phenylene, naphthylene, phenanthrylene, and anthrylene, their hydrogenated analogs, e.g. cycloaklylene, and substituted derivatives of the foregoing wherein the substituents are selected from among halo, nitro, amino, azo, alkyl, cyano, hydroxy, carboxy and sulfo. Generally, each substituted derivative contains no more than about 30 atoms. A presently most preferred group of polyether compounds for use when the cation of the chromium salt is ammonium is that which contains 6 oxygen atoms in the macrocyclic ring. While not wishing to be bound by theory, it is believed the invention works as a result of the solubilizing agent physically surrounding the cation of the chromium salt and reducing its polarity. Thus the resulting material may not be a complex in the usual sense of the word, but the word complex is nevertheless used herein to describe the solubilized composition. Specific examples of these include 18-crown-6 (1, 4, 7, 10, 13, 16-hexaoxacyclooctadecane), dibenzo-18-crown-6 (2, 3, 11, 12-dibenzo-1, 4, 7, 10, 13, 16-hexaoacyclootadeca-2, 11-diene), and dicyclohexano-18-crown-6 (2, 3, 11, 12-dicyclohexano-1, 4, 7, 10, 13, 16-hexaoxacyclooctadecane) also names as 2, 5, 8, 15, 18, 21-hexaoxatricyclo [20.4.0.0$^{9,14}$] hexacosane.

Specific examples of other suitable macrocyclic polyether compounds (trivial names for simplicity) include 12-crown-4, monobenzo-15-crown-5, bis(4-t-butylbenzo)-21-crown-7, tetrabenzo-24-crown-8, monocyclohexano-27-crown-9, and 30-crown-10. The compounds are more completely disclosed in the cited references.

Any chromium-containing salt which is insoluble in nonaqueous solvents which do not easily rehydrate the silica but which can form a complex with the solubilizing agent such as the macrocyclic polyether compounds and which is at least partially converted into chromium oxide when calcined in an oxygen-containing atmosphere can be employed. Presently preferred chromium salts, however, are the chromates and/or dichromates of ammonia, alkali metals and alkaline earth metals. The ammonium salts are particularly preferred since after calcination only chromium oxide remains in the finished catalyst.

The type of solvents in which the chromium salts are initially insoluble are nonaqueous solvents which do not easily rehydrate the silica. This excludes water and in general primary alcohols. Included in this class of solvents are hydrocarbons, halohydrocarbons, acetonitrile, and for the most part ketones, tertiary alcohols and secondary alcohols. After solubilization, the chromium salts are soluble in these solvents.

The salt/solubilizing agent complexes can be formed by combining the solubilizing agent and the salt together in one of the nonaqueous solvents which does not easily rehydrate the silica as defined hereinabove to thus convert the salt to a chromium-containing composition soluble in the solvent used to form the complex. Preferably, the resulting solution is used to impregnate the particulate support with the thus solubilized chromium salt, the solvent is evaporated and the composite is calcined in a dry oxygen-containing atmosphere to activate it for polymerization.

The use of the above described solubilizing agents such as crown ethers makes it possible to anhydrously impregnate catalyst supports with chromium salts such as chromate or dichromate salts which are normally insoluble in nonaqueous solvents which do not easily rehydrate the silica. This is useful in cases where the pore structure or surface of the support may be adversely affected by water or other solvents which easily rehydrate the silica.

The mole ratio of crown ether to chromium-containing salt can vary depending upon the cation content of the salt. Thus, when the salt is $(NH_4)_2 CrO_4$, about one mole of crown ether and about 0.5 mole of $(NH_4)_2 CrO_4$ are employed in preparing the complex, i.e. one mole of solubilizing agent per equivalent of cation. A slight deficiency of solubilizing agent or a substantial excess can be tolerated, however, i.e. from 0.9 to 2 moles of solubilizing agent per equivalent of cation, for instance.

The activation is carried out in oxygen ambient such as air at a temperature generally within the range of 800° to 1832° F. (427° to 1000° C.). However, one unexpected benefit flowing from the use of the invention is that the catalysts reach a peak in melt index potential at essentially the same temperature as do aqueously impregnated chromium composites, i.e. about 1500° to 1700° F. (816° to 927° C.) which compares with conventional anhydrously impregnated chromium compositions which reach a peak in melt index potential when activated at about 900° to 1200° F. (482° to 649° C.). Hence, a preferred activation procedure is to activate at 1500° to 1700° F. in air. Activation times are generally at least 5 minutes, preferably ½ to 10 hours, more preferably 1 to 4 hours. Of course, the time and temperatures can be influenced by the percent of oxygen in the oxidation ambient.

The catalysts of this invention can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary comonomers include aliphatic 1-olefins such as propylene, 1-butene, 1-hexene, and other lower mono-1-olefins and conjugated or nonconjugated diolefins such as 1,3-butadiene, isoprene, piperylene, 2,3-dimethyl-1,3-butadiene, 1,4-pentadiene, 1,7-hexadiene and other such diolefins and mixtures thereof. Ethylene copolymers preferably constitute at least 90, preferably 95 to 99 mole percent polymerized ethylene units. Ethylene, propylene, 1-butene, and 1-hexene are especially preferred.

The polymers can be prepared from the catalysts of this invention by solution polymerization, slurry polymerization, and gas phase polymerization techniques using conventional equipment and contacting process. However, the catalysts of this invention are particularly suitable for use in slurry polymerizations to produce polymer having a good balance of rheological properties such as melt index and response to shear. Hydrogen can be used to further increase the melt index if desired. Temperatures for slurry polymerization, i.e., polymerization at a temperature where the polymer formed is predominantly insoluble in the diluent are about 66° to 110° C. (150° to 230° F.) for predominantly ethylene polymers.

EXAMPLE I—CATALYST PREPARATION

A sample of commercially available, dry silica-titania cogel containing 2 weight percent titanium was calcined for 5 hours under fluidizing conditions with dry air, then cooled and stored in a desiccator until ready for further use.

The crown ether employed in preparing each catalyst was dicyclohexano-18-crown-6. A solution of it in acetone was prepared by dissolving 2 g of the crown ether in 10 ml of acetone.

Catalyst A was prepared by contacting about 10 ml of acetone containing 0.269 g of ammonium chromate with sufficient crown ether solution to provide 1.32 g of the ether. The mixture was stirred about 16 hours (overnight) diluted to 30 ml with acetone and stirring continued briefly to obtain a homogeneous solution. The solution was gradually added to 7.1 g of the calcined silica-titania cogel with vigorous shaking to form a slurry. The slurry was dried on a hot plate under a stream of dry nitrogen until a free-flowing product was obtained after which it was stored in a desiccator until it was to be activated for ethylene polymerization runs. The amount of chromium contained in the dry composite was calculated to be 1.3 weight percent. Analysis of the calcined catalyst gave a chromium content of 0.84 weight percent.

Catalyst B was prepared in the fashion employed above by admixing about 10 ml acetone containing 0.223 g ammonium dichromate with sufficient crown ether solution to provide 0.66 g of the ether. The mixture was stirred and diluted as before. It was finally admixed with 6.3 g of the calcined silica-titania cogel to obtain a slurry which was dried and stored in the manner previously described. The amount of chromium contained in the composite on a dry basis was calculated to be 1.4 weight percent. Analysis of the calcined catalyst gave a chromium content of 1.55 weight percent.

Catalysts A and B were separately activated for ethylene polymerization by heating each sample in a 65 mm diameter activator tube under fluidizing conditions with dry air flowing at the rate of 42 standard liters per hour for 4 hours at 371° C. After activation each sample was cooled, recovered, and stored in a desiccator for future use. Catalyst A was bright orange in color and catalyst B was burnt orange in color.

A portion of each previously activated catalyst A and B was separately heated for an additional hour in the activator with 42 standard liters per hour of dry air at 538° C. to obtain catalyst $A_1$ which was bright orange in color and catalyst $B_1$ which was dark orange-brown in color.

A portion of each previously activated catalyst $A_1$ and $B_1$ was separately heated for an additional hour in the activator with 42 standard liters per hour of dry air at 649° C. to obtain catalyst $A_2$ which was dark orange in color and catalyst $B_2$ which was brown in color.

A portion of each previously activated catalyst $A_2$ and catalyst $B_2$ was separately heated for an additional hour in the activator with 42 standard liters per hour of dry air at 760° C. to obtain catalyst $A_3$ and catalyst $B_3$ which were unchanged in color.

A portion of each previously activated catalyst $A_3$ and catalyst $B_3$ was separately heated for an additional hour in the activator with 42 standard liters per hour of dry air at 871° C. to obtan catalyst $A_4$ which was brown-orange in color and catalyst $B_4$ which was brown-green in color.

All activated catalysts after cooling were stored in a desiccator until ready for the subsequent ethylene polymerization tests.

EXAMPLE II—ETHYLENE POLYMERIZATION

Ethylene was polymerized in each run by contact with the catalyst in a stirred, stainless steel reactor of 2.0 liter capacity containing about 1.5 liters of isobutane diluent. Each run was conducted at 107° C. with a reactor pressure of 550 psig (3.8 MPa) for a time sufficient to obtain a polymer yield of about 5000 g per g catalyst. Each run was terminated by stopping the ethylene flow, flashing ethylene and diluent, and recovering the polymer. The amount of catalyst employed in each run and the results obtained are presented in Tables IIA and IIB.

TABLE IIA

Ethylene Polymerization, Supported Catalyst Based on Ammonium Chromate-Crown Ether Complex

| Run No. | Catalyst No. | Activation Temp. °C. | Weight g | Reaction Time, Min. Induction | Reaction Time, Min. Polym. | Productivity g/g (a) | Corrected MI(b) | HLMI MI(c) |
|---|---|---|---|---|---|---|---|---|
| 1 | A | 371 | .0410 | 4 | 58 | 4490 | 0.66 | 50 |
| 2 | $A_1$ | 538 | .0508 | 13 | 60 | 4960 | 0.74 | 53 |
| 3 | $A_2$ | 649 | .0339 | 16 | 50 | 4840 | 1.9 | 46 |
| 4 | $A_3$ | 760 | .0428 | 11 | 40 | 4390 | 3.0 | 43 |
| 5 | $A_4$ | 871 | .0339 | 14 | 60 | 5070 | 3.4 | 42 |

(a) Productivity, g polymer per g catalyst.
(b) Melt index corrected to a common productivity of 5000 g polymer per g catalyst.
(c) Ratio of high load melt index (ASTM D 1238-65T, Condition F) to melt index (ASTM D 1238-65T, Condition E).

TABLE IIB

Ethylene Polymerization, Supported Catalyst Based on Ammonium Dichromate-Crown Ether Complex

| Run No. | Catalyst No. | Activation Temp. °C. | Weight g | Reaction Time, Min. Induction | Reaction Time, Min. Polym. | Productivity g/g | Corrected MI | HLMI MI |
|---|---|---|---|---|---|---|---|---|
| 6 | B | 371 | .0450 | long(d) | 150 | 2700 | 0.35 | 60 |
| 7 | $B_1$ | 538 | .0566 | 56 | 70 | 5190 | 0.80 | 65 |
| 8 | $B_2$ | 649 | .0533 | 51 | 55 | 4830 | 1.3 | 56 |
| 9 | $B_3$ | 760 | .0460 | 77 | 56 | 5020 | 1.8 | 50 |
| 10 | $B_4$ | 871 | .0503 | 13 | 60 | 5030 | 3.6 | 44 |

(d)In excess of 60 minutes.

Inspection of the results given in the Tables show that active ethylene polymerization catalysts are produced. The melt index values obtained ranging from about 0.3 to about 4 and HLMI/MI ratios ranging from 42 to 65 are indicative of commercially attractive polymers which can be utilized in film, injection molding, blow molding and the like.

The data indicates that the melt index capability of catalysts A and B are improved as the activation temperatures employed increase from 371° to 871° C. This behavior resembles that of chromium oxide-silica catalysts prepared by admixing chromium trioxide with a silica-titania hydrogel and removing water from the mixture by azeotrope drying with ethyl acetate as disclosed in said U.S. Pat. No. 3,887,494.

The polymer melt index values shown in the Tables cannot be obtained by impregnating the selected calcined silica-titania substrate with aqueous solutions of either ammonium chromate or ammonium dichromate and recalcining the mixtures to produce catalysts. Contact of the large pore support with water has a deleterious effect and catalysts produced with the water-treated supports have substantially diminished melt index capability.

The ammonium salts mentioned above are not soluble by themselves in the acetone employed in forming solutions of the crown ether-ammonium salt complexes. The use of such complexes dissolved in acetone, acetonitrile, hydrocarbons, halohydrocarbons, secondary alcohols, tertiary alcohols or mixtures thus affords a way of impregnating water-sensitive silica supports with otherwise insoluble inorganic chromium-containing salts which are capable of forming complexes with a crown ether.

While this invention has been described in detail, it is not to be construed as limited thereby but is intended to cover all changes and modifications within the spirit and scope thereof.

We claim:

1. A process for producing a catalyst comprising:
   contacting a chromium-containing salt, which is insoluble in nonaqueous solvents which do not easily rehydrate silica, with a solubilizing agent thus converting it to a chromium-containing complex having charged ions which is soluble in said nonaqueous solvents;
   impregnating a particulate support with the thus solubilized chromium-containing complex dissolved in a nonaqueous solvent which does not easily rehydrate silica; and
   activating said thus impregnated support by heating same in an oxygen ambient at a temperature sufficient to oxidize at least a portion of said chromium.

2. A process according to claim 1 wherein said chromium-containing salt is selected from chromates, dichromates and mixtures thereof.

3. A method according to claim 1 wherein said solubilizing agent is a crown ether.

4. A method according to claim 1 wherein said particulate support is a silica-titania cogel.

5. A method according to claim 1 wherein said activation is carried out in air at a temperature within the range of 1500° to 1700° F.

6. A method according to claim 1 wherein said chromium-containing salt is selected from ammonium chromate and ammonium dichromate and wherein said solubilizing agent is a substituted or unsubstituted 18-crown-6 macrocyclic polyether.

7. A method according to claim 6 wherein said macrocyclic polyether is dicyclohexano-18-crown-6.

8. A method according to claim 7 wherein said activating is carried out in air at a temperature within the range of 1500° to 1700° F.

9. A method according to claim 8 wherein said nonaqueous solvent is acetone and wherein said chromium salt is contacted with said solubilizing agent by mixing the two together in acetone.

10. A method according to claim 1 wherein said nonaqueous solvent is selected from hydrocarbons, halohydrocarbons, acetonitrile, ketones, tertiary alcohols and secondary alcohols.

11. A process for producing a catalyst comprising:
    contacting a chromium-containing salt selected from ammonium chromate and ammonium dichromate with dicyclohexano-18-crown-6 macrocyclic polyether which acts as a solubilizing agent thus converting said salt to a chromium-containing composition which is soluble in acetone;
    impregnating a silica-titania cogel particulate support with the thus solubilized chromium-containing composition dissolved in acetone; and
    activating said thus impregnated support by heating same in air at a temperature within the range of 1500°–1700° F.

* * * * *